United States Patent
Garrity et al.

(10) Patent No.: US 8,302,153 B1
(45) Date of Patent: Oct. 30, 2012

(54) SYSTEMS AND METHODS FOR SECURING EXTRANET TRANSACTIONS

(75) Inventors: Sharyn Marie Garrity, Andover, MA (US); Ronald Lewis Scott, Eden Prairie, MN (US); Aaron Mark Helsinger, Somerville, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 09/426,442

(22) Filed: Oct. 25, 1999

Related U.S. Application Data (60) Provisional application No. 60/138,239, filed on Jun. 9, 1999.

(51) Int. Cl.
*G06F 7/04* (2006.01)

(52) U.S. Cl. .......................................... 726/2; 713/182

(58) Field of Classification Search .................. 713/156, 713/166, 182; 726/2
See application file for complete search history.

(56) References Cited

U.S. PATENT DOCUMENTS

| | | | | |
|---|---|---|---|---|
| 4,962,533 A * | 10/1990 | Krueger et al. | ............... | 711/163 |
| 5,774,552 A * | 6/1998 | Grimmer | ...................... | 713/156 |
| 5,948,064 A * | 9/1999 | Bertram et al. | ............... | 709/225 |
| 6,023,765 A * | 2/2000 | Kuhn | ................................. | 726/4 |
| 6,178,505 B1 * | 1/2001 | Schneider et al. | ............ | 713/168 |
| 6,240,091 B1 * | 5/2001 | Ginzboorg et al. | ............ | 370/401 |
| 6,289,462 B1 * | 9/2001 | McNabb et al. | ............... | 713/201 |
| 6,367,009 B1 * | 4/2002 | Davis et al. | ................... | 713/166 |
| 2001/0020242 A1 * | 9/2001 | Gupta et al. | ............... | 707/501.1 |

* cited by examiner

*Primary Examiner* — Christopher Brown (57) ABSTRACT

The systems and methods described herein relate to secure extranets which utilize certificate authentication to mediate access, transactions, and user tracking. Such extranets may be employed to provide an interface accessible over a network, such as the Internet, capable of authenticating and recording transactions for business, medical, or other purposes.

19 Claims, 8 Drawing Sheets

SYSTEMS AND METHODS FOR SECURING EXTRANET TRANSACTIONS

This application is based on U.S. Provisional Application No. 60/138,239, filed Jun. 9, 1999.

BACKGROUND OF THE INVENTION

1. Field of the Invention

This application relates to the field of digital data communication, more particularly to the field of using extranets to access data in connection with digital data communication.

2. Description of the Related Art

The proliferation of computers in the workplace has led to the development of several distinct types of networks. The Internet, perhaps the most widely familiar of these, allows public access to a tremendous amount of information scattered around the world. Intranets, on the other hand, are networks whose access is generally limited to on-site users at a business or other institution, although dial-up access is often available. Intranets may be used for storing data and files, for interoffice electronic communications, and for other support functions. Access may be limited to the employees of the business or institution. Virtual private networks, or VPNs, have evolved as a means of allowing employees to access their intranet from remote locations, via an interne connection, for example.

None of these methods adequately addresses the need for a company to allow other businesses to access and interact with the company's data under certain constraints. The Internet, for example, permits access by the public, and therefore poses security risks for sensitive information. Although intranets are more secure, having access limited to designated users only, an intranet often contains information to be held private by one business; currently, restricting access to various portions of an intranet to particular users can become unwieldy, often resulting in a multitude of passwords, each being used to obtain access a different area of an intranet. Conventional VPNs, which simply offer remote access to an intranet, do not adequately address this issue in all instances where this feature might be desirable.

To meet these needs, extranets have been developed. An extranet is a private network that uses the Internet protocols and the public telecommunication system to securely share part of a business's information or operations with suppliers, vendors, partners, customers, or other businesses. An extranet can be viewed as part of a company's intranet that is extended to users outside the company. However, existing extranet technologies suffer from a number of deficiencies. For example, as described for intranets above, it may be difficult or cumbersome to reserve access to portions of an intranet to a subset of users. Furthermore, security provisions, such as user identification systems and document certification and verification techniques, have not fully been implemented in a manner that meets the needs of all potential extranet users. Thus, existing extranets may not provide the layered, secure functionality required by modern businesses.

SUMMARY OF THE INVENTION

The systems and methods described herein relate to providing secure access and transactions using an extranet. In certain embodiments, digital certificates are used to regulate access and authenticate transactions. For example, in one embodiment, the systems and methods described herein relate to an access system for a computer site, including a certificate authentication component to verify a user's identity from a digital certificate supplied by the user, a directory coupled to the certificate authentication component to store information representative of a plurality of users including an access policy for each user, and an access control system coupled to the directory to restrict access to the user based on the access policy associated with the user in the directory. In certain embodiments, the access policy includes information representative of a portion of the computer site to which the user is permitted access. In certain embodiments, the system also includes a certificate authority component coupled to the certificate authentication component to issue digital certificates to the user. In certain embodiments, the system also includes a log system coupled to the certificate authentication component to record the user's actions in the computer site. In certain embodiments, the computer site is an extranet.

In certain embodiments, the system includes a transaction authentication system coupled to the certificate authentication component to provide verified records of transactions performed using the computer site. In certain embodiments, the transaction authentication system includes a digital signing module for validating transactions.

The systems and methods described herein further provide a method of regulating access to a computer site by receiving from a user a request to access a computer site or a portion thereof, receiving information representative of the user's identity, consulting a directory containing information representative of a plurality of users, said information including an access policy for each user, to determine whether the user is permitted to access the computer site or portion thereof, and granting or denying access to the user according to the access policy for the user. Consulting a directory may include checking the access policy to determine a portion of the computer site to which the user is permitted access. Receiving a request may include receiving a URL address for a site within the computer site. Receiving information representative of the user's identity may include receiving a password, a retinal scan, a fingerprint, a digital certificate, or a document capable of being decrypted by a public key.

In yet another aspect, the systems and methods relate to an access system for a computer site, including means for verifying a user's identity from a digital certificate supplied by the user, means for storing information representative of a plurality of users, said information including an access policy for each user, and means for restricting access to the user based on the access policy associated with the user in the means for storing information. In certain embodiments, the means for storing information includes information representative of a portion of the computer site to which the user is permitted access. In certain embodiments, the system further includes means for issuing digital certificates to the user. In certain embodiments, the system includes means for recording the user's actions in the computer site. In certain embodiments, the system also includes means for storing verified records of transactions performed using the computer site.

BRIEF DESCRIPTION OF THE FIGURES

The following figures depict certain illustrative embodiments of the present system in which like reference numerals refer to like elements. These depicted embodiments are to be understood as illustrative of the invention and not as limiting in any way.

DETAILED DESCRIPTION OF THE ILLUSTRATED EMBODIMENTS

The description below pertains to several possible embodiments of the invention. It is understood that many variations of the systems and methods described herein may be envisioned by one skilled in the art, and such variations and improvements are intended to fall within the scope of the invention. Accordingly, the invention is not to be limited in any way by the following disclosure of certain illustrative embodiments.

The present invention relates to secure extranets capable of providing access to designated resources to a set of users. Secure extranets, as contemplated herein, may permit secure transactions, e.g., using certificate-based authentication, provide tiered access for different users to a plurality of security levels, and track access by particular users. The invention further relates to access control systems for regulating access to computer sites such as extranets.

As described above, a secure extranet may control resource access to each user based upon the privileges allotted to that user and based on the identity confirmed by certificate authentication. For example, the secure extranet may allow access to product descriptions, pricing, and availability to users designated as customers, while users designated as partners may be permitted access to accounting records, licensing agreements, and other more sensitive information. Each user may thus be given access to a particular subset of the resources based on the relationship of that user to the extranet-maintaining organization, the needs of the user, the responsibilities of the user, or any other desired criteria.

By authenticating transactions using the public key infrastructure (PKI), a secure extranet may facilitate transactions, such as ordering, exchanging money for goods or services, or obtaining information, that require confirmation of identity and authority. In one embodiment, for example, a user may send a certificate to an extranet authenticating the user's public key. After the extranet has determined that the certificate is valid, the user may transmit to the extranet a transmission which has been encrypted by the user's private key. The extranet, by decrypting this transmission with the user's public key, verifies that the transmission originated from the user and may grant access to the extranet, such as through a firewall. Furthermore, the extranet may send to the user a transmission encrypted by the user's public key, thereby protecting the transmission from theft or unauthorized viewing.

In another embodiment, the extranet may additionally send a certificate to the user authenticating the extranet's public key. The user may then transmit to the extranet a transmission which has been encrypted by both the extranet's public key and the user's private key. The extranet may then decrypt this transmission using the extranet's private key and the user's public key. Similarly, the extranet may transmit to the user a transmission which has been encrypted using the extranet's private key and the user's public key. The user may then decrypt this transmission using the extranet's public key and the user's private key. In this way, all transmissions sent between the extranet and the user require a private key for decryption, increasing the security of the transmissions as long as the private keys remain secret. Furthermore, because each transmission has been encrypted with a private key, the use of a particular public key to decrypt the transmission identifies the source of the transmission, as long as the private keys remain secret.

In yet another embodiment, the extranet may communicate with a client or user while employing another encryption technique, such as the data encryption standard (DES), the secure sockets layer (SSL) protocol, or any other suitable encryption or security protocol known to one of skill in the art.

A secure extranet may permit identification and monitoring of users who access the system. For example, unlike in prior systems which use a common password for access to the extranet, a user may enter the system by sending a certificate to the system, or by encrypting transmissions using a private key for which the corresponding public key has been verified to the extranet by certificate. Actions performed by the user of the account may be tracked or monitored, for example, to provide a record of the users actions. The secure extranet may monitor the documents accessed by the user, the information requested or received by the user, or any other actions performed by the user while the user is connected to the secure extranet. Thus, the extranet-maintaining organization may track security violations, maintain access records for particular documents, or monitor or record any other pertinent information.

Figure 1:
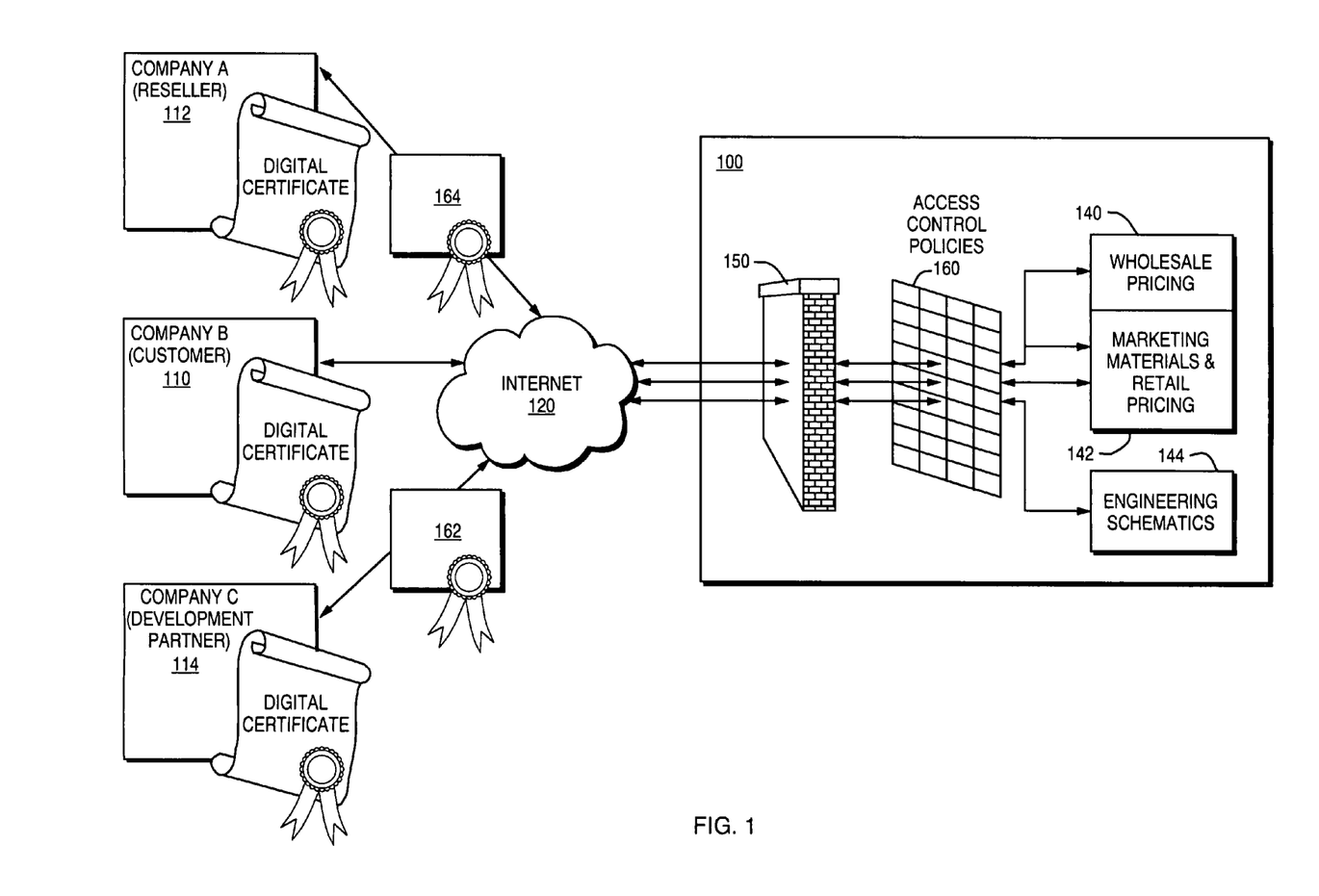
FIG. 1 depicts one embodiment of a secure extranet according to the present invention.

Thus, in one embodiment, as shown in FIG. 1, an extranet 100 may be employed by a company to communicate with a customer 110, a reseller 112, and a development partner 114. Each of these entities may access the extranet 100, for example, through the Internet 120. An access control policy server 160 may determine the access privileges associated with the customer's identity, as verified by certificate authentication, and permit the customer access to a marketing materials and retail pricing section 142 of the extranet 100, but not to a wholesale pricing section 140 or an engineering schematics section 144. Similarly, the access control policy server 160 may permit a reseller 112 access to the wholesale pricing section 140 and the marketing materials and retail pricing section 142, and not to the engineering schematics section 144. The extranet 100 may be protected from the unauthorized users on the Internet 120 by a firewall 150.

Transactions performed over the secure extranet 100 may be authenticated through the use of digital certificates. For example, the reseller 112 may place an order authenticated by a certificate 164. Similarly, the development partner 114 may obtain an authenticated schematic 162 from the engineering schematics section 144, or deposit the authenticated schematic 162 in the engineering schematics section 144. The use of certificates ensures the identity and the authority of the transacting partners, as do signatures applied to conventional paper transactions and contracts. Furthermore, information transmitted over public networks, such as the Internet, may be encrypted to further protect sensitive transmissions.

The access system described above for the secure extranet simplifies several aspects of extranet access. For example, rather than subdividing an extranet into a number of regions, each of which is accessed separately, each user is permitted access to a subset of regions based on the user's identity as authenticated by certificate. In this way, the access can be controlled by the system, without requiring repeated inputs from the user to regulate access. The access control policy server thus provides access to the subset of regions of the extranet without requiring a series of passwords for entry. The user may navigate the extranet freely, within the regions of the extranet designated for access, and the extranet-maintaining organization may track the usage of the extranet associated with each user.

A secure extranet as described herein may be configured to be expandable. For example, the extranet system architecture may include a number of modular components, each of which may be replaced or adapted to suit the changing needs of the extranet-maintaining organization. For example, as the organization grows, the extranet may be modified to handle up to 100 users, or up to 1000 users, or up to 10,000, or more. Additionally, portions of the extranet system may be amenable to modification to maintain compatibility or support for growing technologies or new applications. A secure extranet system architecture of modular components allows the extranet to evolve and adapt without the need for replacing the entire system. Thus, extranet continuity, compatibility, and viability may be maintained over substantial time periods, despite changing technology and business needs.

Several components may be employed in an extranet system to provide certain extranet capabilities and functions. For example, a firewall server may provide firewall protection for the extranet. Commercially available systems, such as CHECKPOINT FIREWALL-1 or another firewall component may be employed in this capacity. In certain embodiments, one firewall may divide the extranet from external networks, such as the Internet, and a second firewall may divide the extranet from corporate networks, such as intranets and fileservers. Another component may be a web server, a functionality which may be provided by NETSCAPE ENTERPRISE SERVER or an equivalent component. A separate extranet web server may also be utilized. NETSCAPE ENTERPRISE SERVER, MS IIS, or any other extranet web server system may fulfill this function. A certificate authority (CA) server, such as CYBERTRUST ENTERPRISE CA, may be included to provide authentication services or to issue digital certificates. An LDAP (Lightweight Directory Access Protocol) or other suitable directory can be implemented using a directory server such as NETSCAPE DIRECTORY, ISOCOR, or other LDAP servers. An extranet database may be maintained using a component such as ORACLE8I or another suitable database server. A number of components are available to provide access control functionality, such as NETEGRITY SITEMINDER, ENCOMMERCE GETACCESS, ENTEGRITY, AVENTAIL, MS IIS, and NETSCAPE ENTERPRISE SERVER. Other access control policy servers will be known to those of skill in the art and may be used in this capacity.

A security application may also be used in an extranet to carry out any of a number of functions. For example, the security application may receive identification data from a user to identify the user. The identification data may represent a password, a retinal scan, a fingerprint, a digital certificate, a document capable of being decrypted by a public key, or any other data which provides acceptable security for the extranet. The security application may operate in connection with a policy server described above, or may itself perform the functions of a policy server, to control the access of an identified user to different portions of the extranet. For example, in a web-based embodiment, when a user attempts to enter a URL address of a web site of the extranet, the web server may verify the user's identity with the security application, which may consult the access control policy server or a corresponding LDAP directory to determine if the user is permitted to access that URL address. Access to the site may then be granted or denied on the basis of the information retrieved.

In certain embodiments, the security application may operate in conjunction with or include the certificate authority. For example, the security application may control the issuance of certificates by the extranet to appropriate users, and may regulate the distribution of such certificates to ensure reliable and secure transmission of the certificates to the designated receivers and to inhibit unauthorized distribution of certificates. The security application may also determine the issuer of a certificate, and restrict access to users who provide a certificate issued by a trusted entity, such as the extranet itself, associated systems, or trusted third parties, as determined by the certificate root or other information indicative of the issuer of a certificate.

The security application may be integrated with the policy server or the LDAP directory. For example, the LDAP directory, which may be included in the security application, may provide information, such as certificates or other certified information, relating to a plurality of extranet users and the regions or sites of the extranet to which they are permitted access. In certain embodiments, users are categorized into discrete sets or categories, and each set is granted access to a particular portion of the extranet. The access control policy server, which may be included in the security application, may prevent or restrict access to regions or sites which the user is not authorized to enter.

The security application may track the actions of users and maintain a record of the actions of each user, e.g., business transactions, site entry, document access, etc. The security application may also maintain an account for each user, for example, for tracking available credit, recording purchases and/or sales, designating discounts, or other relevant functions. The security application may include a digital signing module that produces and stores a digital signature and/or time stamp for each transaction, for example, for confirming and recording business agreements, contracts, records, submissions, or other transactions. Thus, the record of a transaction may be viewed at a later time by the user or extranet administrator to verify, validate, or confirm the transaction. In certain embodiments, the signature may include encryption of the record, or a data segment appended to a record, which functions to validate or secure the record, and may itself be encrypted. In certain embodiments, the signature may include a time of day at which the transaction was completed or recorded.

In certain embodiments, a certificate, such as a certificate authenticating the identity of the user or the extranet, is stored on a separate device, such as a smart card. Suitable technologies include the IKEY from RAINBOW TECHNOLOGIES, and the ALADDIN SMARTCARD ENVIRONMENT, among others. In certain embodiments, the certificate is a certificate issued by a certificate authority associated with the extranet. In certain embodiments, information stored on the device cannot be directly accessed by the user. A certificate-bearing device may further include information such as a URL or other address for the extranet, attributes or preferences of the user, a source or issuer, e.g., the root, of the certificate, or other suitable information. Certificate-bearing devices may be further protected by requiring a password for use. Thus, in one exemplary embodiment, a certificate-bearing device, when coupled to a user's computer system, prompts the user to provide a password. Additionally, upon entry of the correct password, the device may launch an application, such as a web browser, and connect the user to the extranet. In instances where a public key/private key pair is used, the private key may be stored on the certificate-bearing device in a way that is inaccessible to the user so that the user is inhibited from duplicating or distributing copies of the private key.

By using information such as the user's navigation history or preferences, the security application may further present to the user personalized information, such as information relating to new products or developments in the user's field of interest. In various embodiments, such information may be stored on a certificate-bearing device, on a computer system coupled to the certificate-bearing device, or within the extranet. In certain embodiments, the security application may tailor the prices of offered products based on the particular user. For example, the extranet may discount the price of an offering for a user at an educational institution, for a preferred customer, for a user who has previously made a certain amount of purchases, or for any other situation. The security application may further maintain an account or archive for review by the user, the extranet, or another authorized entity. The account may include information relating to purchases made, available credit, applicable discounts, links to specific recorded transactions, or any other information relating to the user.

Figure 2:
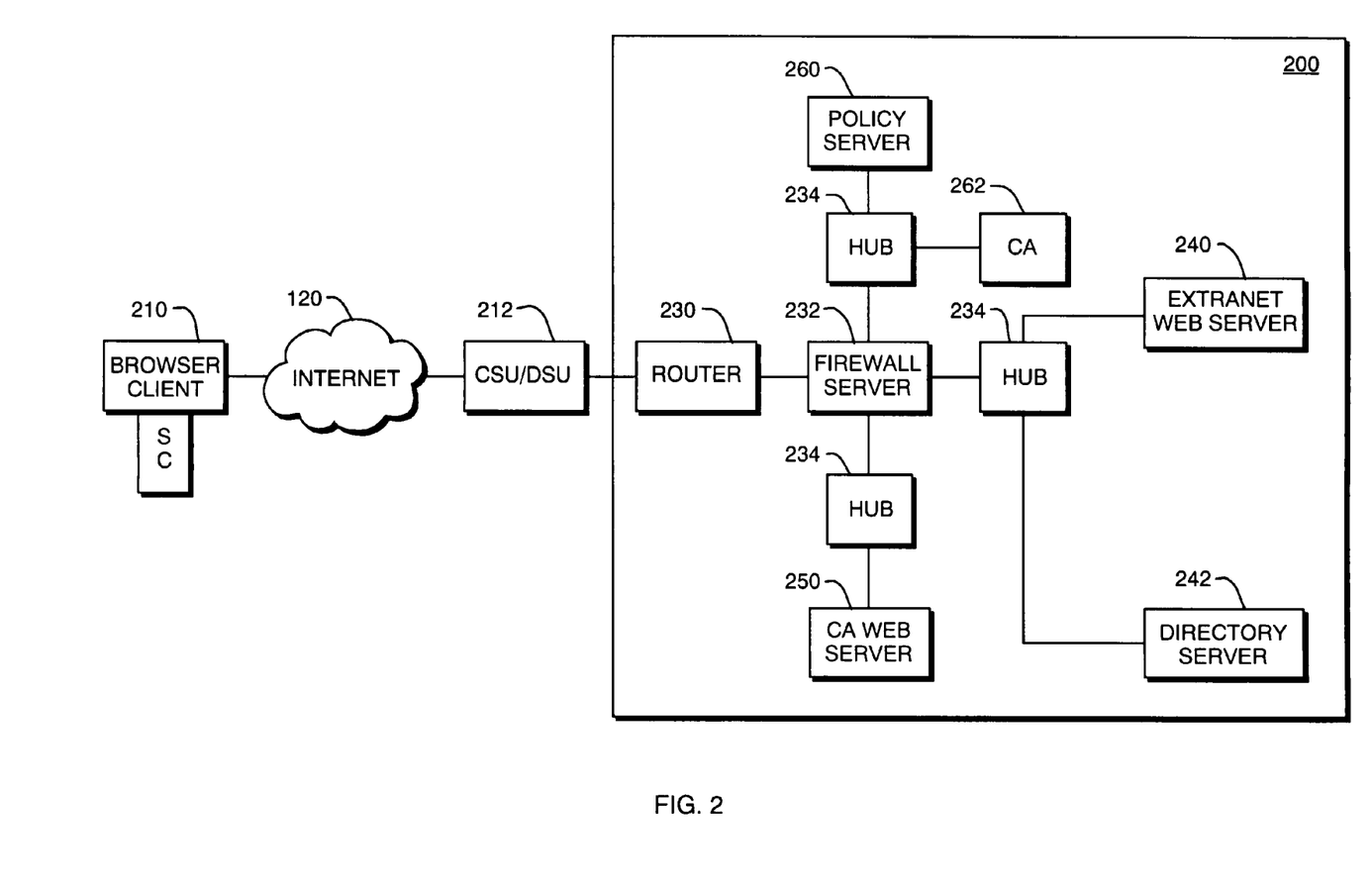
FIG. 2 depicts one configuration of components of a secure extranet according to the present invention.

An extranet as described above, optionally including a security application, may be assembled in any of a variety of configurations. For example, FIG. 2 depicts one example of an extranet bundle configuration 200. A user 210 connects via the Internet 120 and a channel service unit/data service unit (CSU/DSU) 212 to an extranet 200. The connection is handled by a router 230 and proceeds through a firewall server 232. The firewall server 232 may be connected by hubs 234 to an extranet web server 240 and a directory server 242, a certificate authority (CA) web server 250, an access control policy server 260, and a certificate authentication server 262. Other configurations for an extranet bundle will be apparent to those of skill in the art and are intended to be encompassed by the present invention. In an exemplary embodiment, the firewall server 232 may be CHECKPOINT FIREWALL-1 4.0, the extranet webserver 240 may include NETSCAPE ENTERPRISE SERVER 3.61, NETEGRITY SITEMINDER 3.5.1 Web Agent, or VALICERT WEB SERVER VALIDATOR 2.5, the directory server 242 may be NETSCAPE DIRECTORY SERVER 4.0, optionally with VALICERT OCPS VA 2.0 for certificate validation, and the certificate authentication server 262 may be ENTERPRISE CA 3.4.1, although other suitable components will be known to those of skill in the art and may be substituted for any of the foregoing components. The bundle may additionally be configured to run a security application such as CYBERTRUST VAULT with ORACLE WORKGROUP SERVER 8.0.5, or any other applications, as desired. The function of the CA webserver 250 may be performed by NETSCAPE ENTERPRISE SERVER or by a separate component, as is known in the art.

Figure 3:
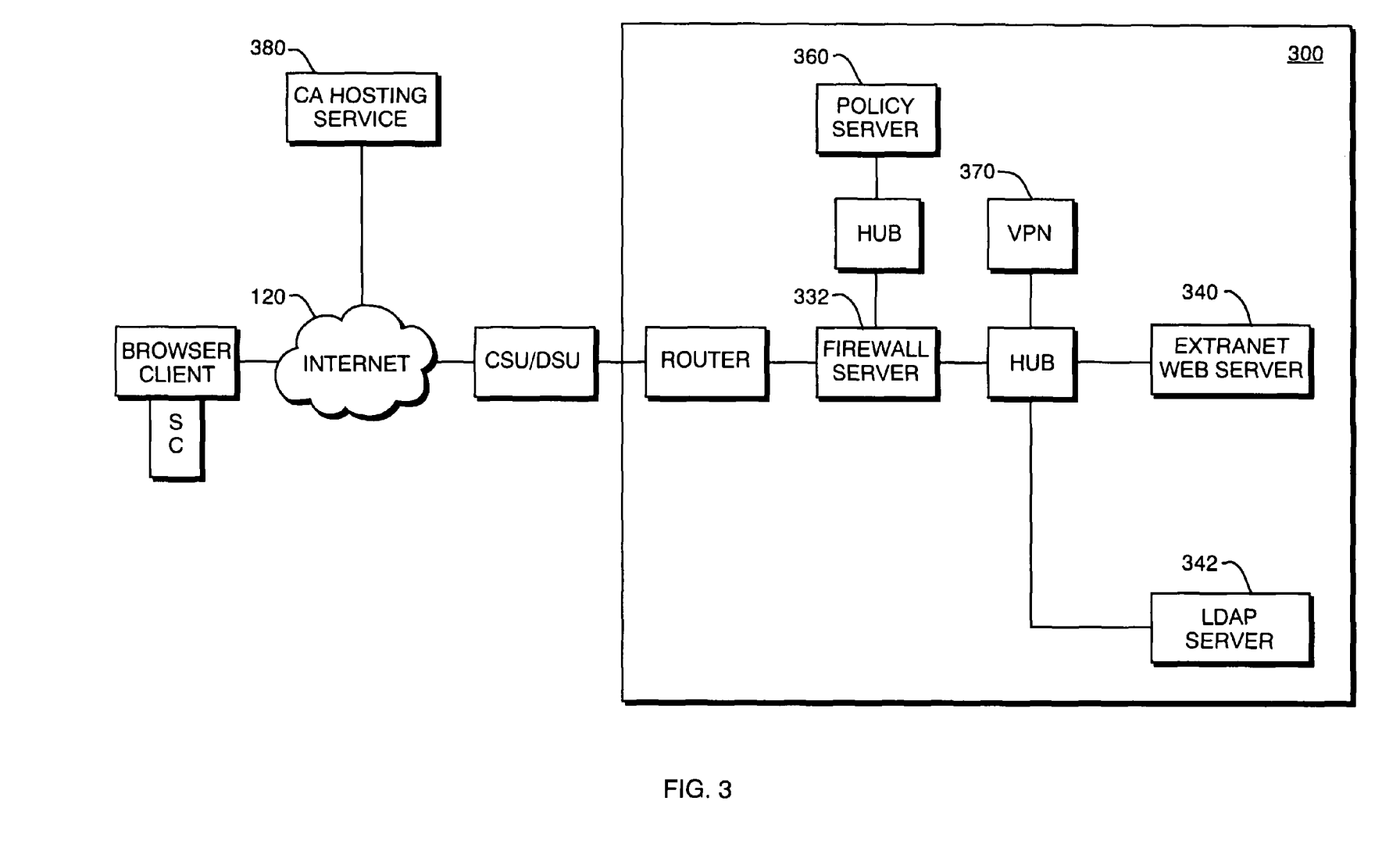
FIG. 3 depicts a configuration of components of a secure extranet using an offsite hosting service according to the present invention.

FIG. 3 depicts a second example of an extranet bundle configuration 300. In this example, the extranet operates using an external hosting service 380. The extranet 300 thus includes a firewall server 332, an extranet web server 340, an LDAP directory server 342, and an access control policy server 360. In this embodiment, the certificate authentication functions are performed by the hosting service 380. The extranet 320 may optionally be linked to a VPN 370.

An assortment of differing extranet bundles, for example, which are tailored to a variety of organization sizes, hardware platforms, or software compatibilities, may be designed so that an extranet bundle may be selected for an organization to approximately meet the particular organization's needs and requirements, as they differ from other organizations. For example, one bundle may be suited for organizations requiring less than 100 users, another bundle for organizations requiring less than 1000 users, and yet another bundle for those organizations requiring service for more than 1000 users.

Figure 4A:
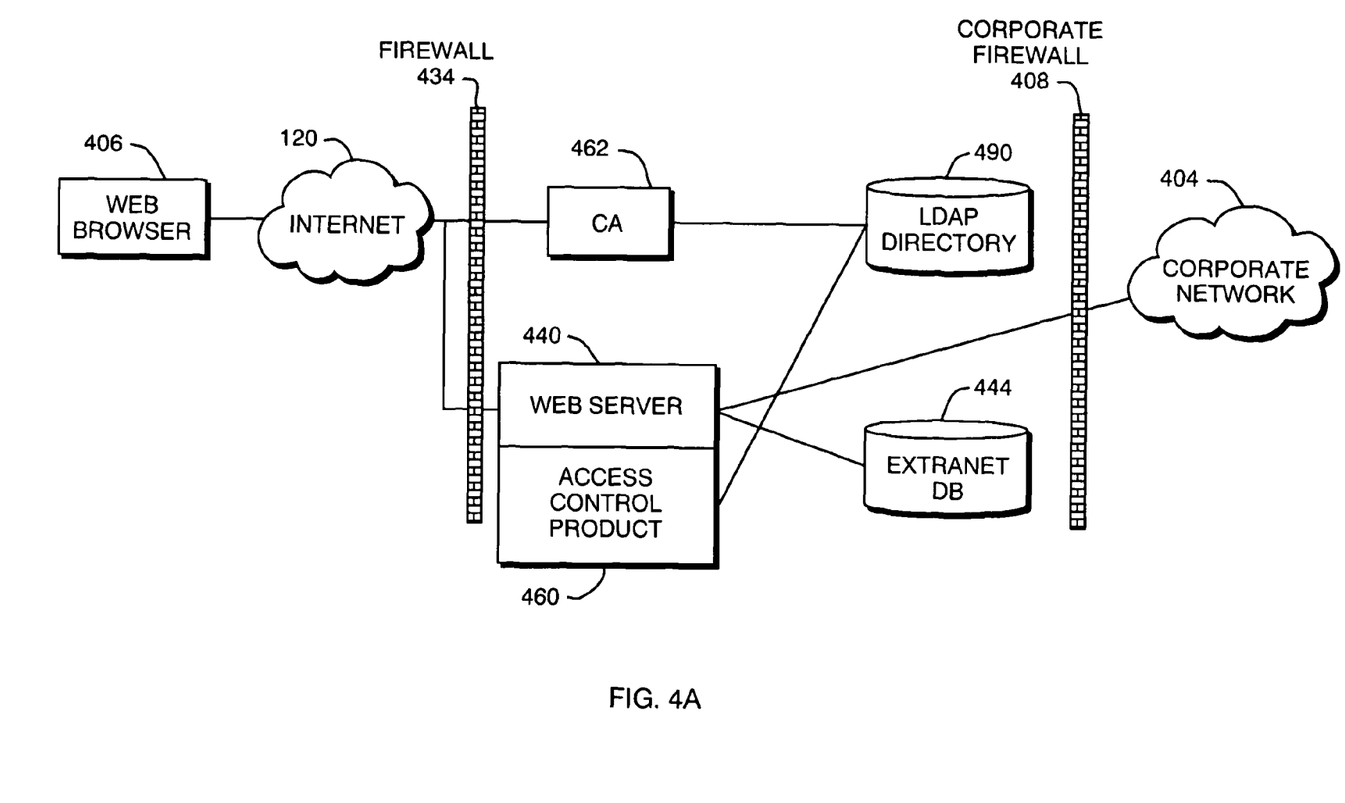
FIGS. 4A, 4B, and 4C depict a variety of extranet configurations with different access modes according to the present invention.
Figure 4B:
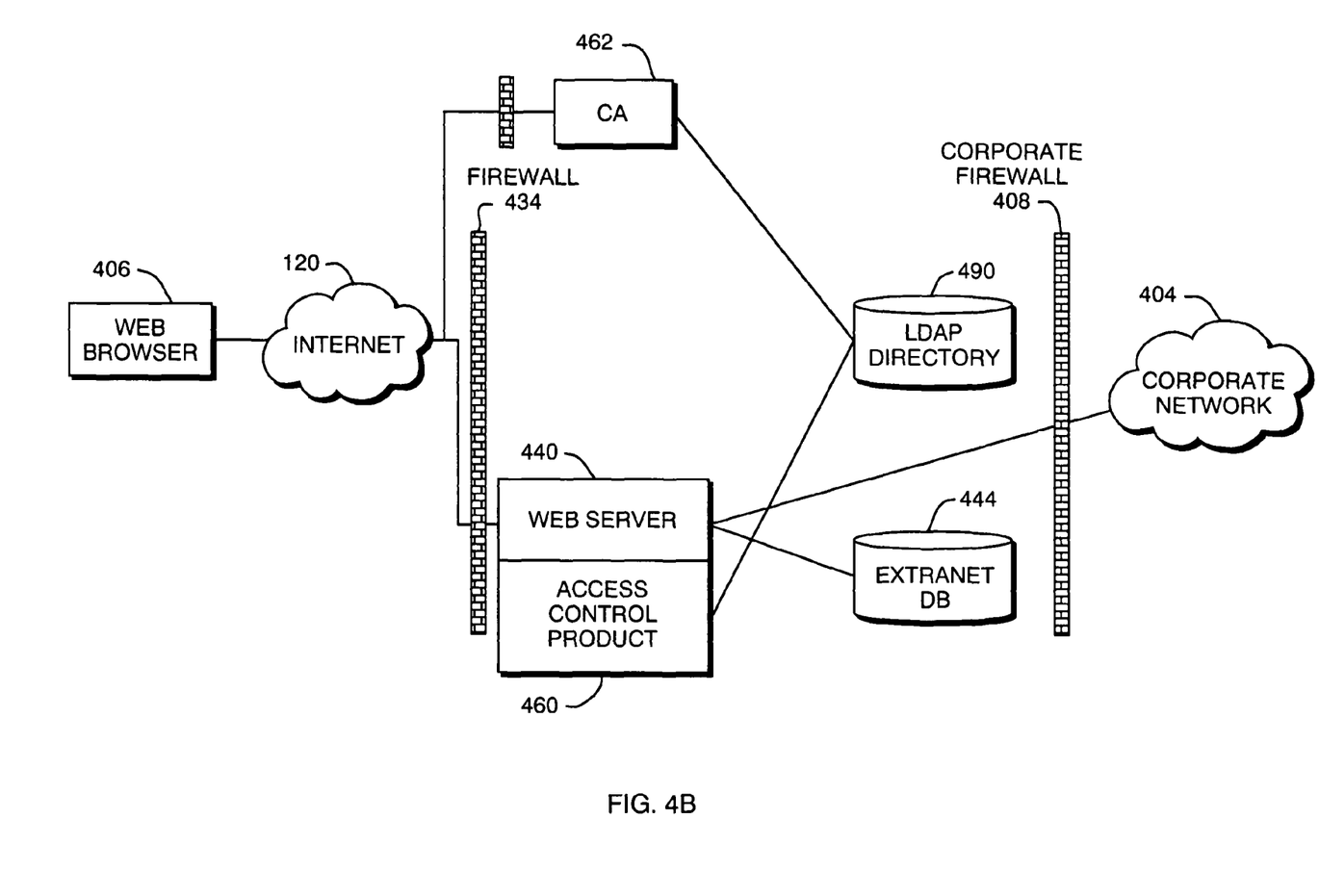

In the configurations described above, a firewall is used to provide a secure barrier between the Internet and the extranet. As shown in FIG. 4A, an additional firewall as described above may be used to separate the extranet from a corporate network, such as an intranet. In the configuration shown in FIG. 4A, a certificate authority server 462 may be connected through a directory 490 to an access control policy server 460. The policy server 460 may be linked to a web server 440 linked to an extranet database server 444. The web server 440 may be linked to the corporate network 404 through the firewall 408. In this configuration, access to applications or data located on an intranet or database may be obtained using real-time access or data replication. NETEGRITY SITEMINDER and ENCOMMERCE GETACCESS are examples of components which may be used for this type of access. The function of a CA server may be performed, as described above, by an external CA hosting service, as depicted in FIG. 4B.

Figure 4C:
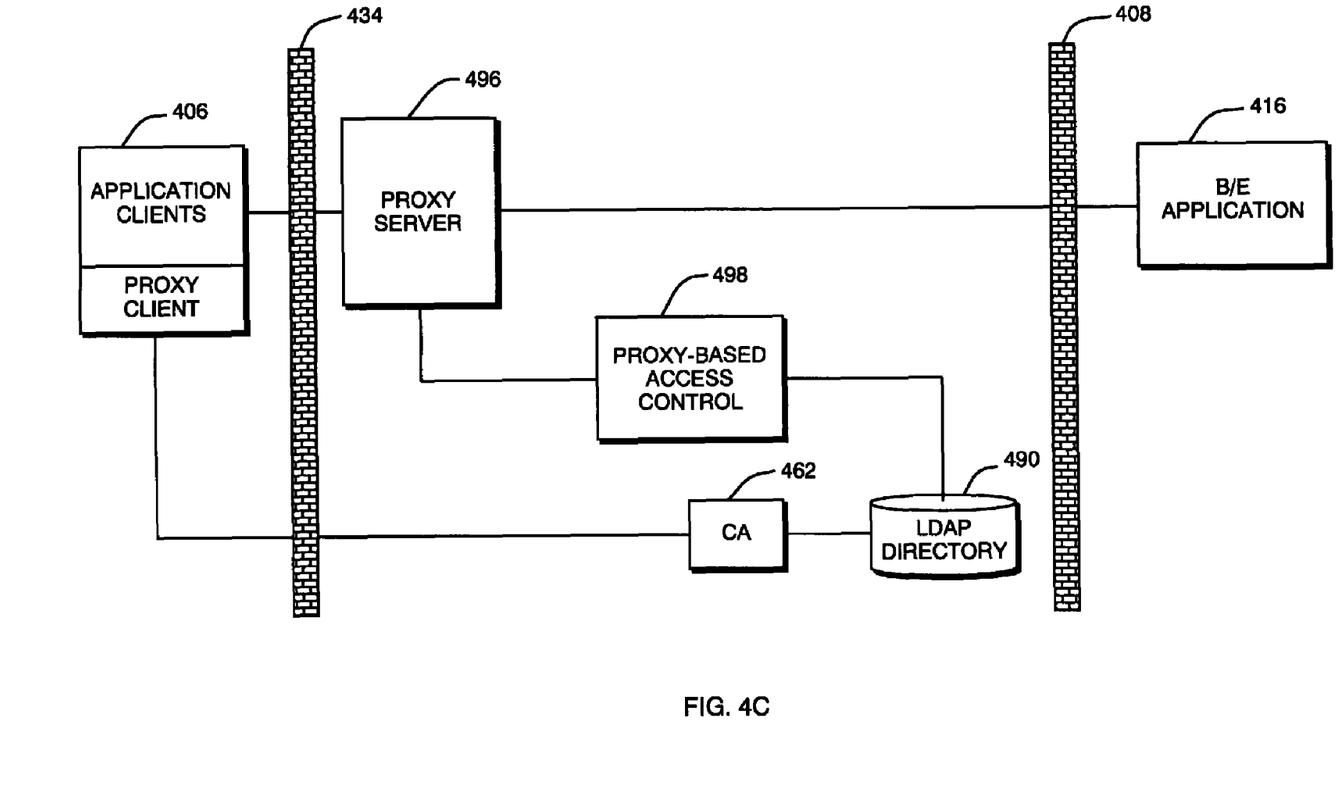

Alternatively, access may be proxy server-based, by using a proxy server as depicted in FIG. 4C. A client 406 may connect through an extranet firewall 434 to a proxy server 496 and a CA server 462. The CA server 462 may be connected to a directory 490, which is also linked to the proxy server 496 through a proxy-based access control 498. Access may then be obtained via the World Wide Web, FTP, or other protocols. BANKONE, GTE AEGIS, NCP, and AVENTAIL are examples of components which may be used in conjunction with proxy server access. The proxy server 496 may also connect through the corporate firewall 408 to a backend application 416, located within the company's network.

In yet another embodiment, access may be VPN-based. This method of access permits secure connectivity to multiple applications and access to selected backend resources. This method of access may be provided in conjunction with a component such as VPN Advantage.

The configurations described above offer a number of advantages. For example, the use of digital certificates for authentication of user identities permits strong protection of access to the extranet and to management functions. The multi-tiered architecture employed in the systems set forth above may include a router providing packet filtering at the front end together with a firewall providing real-time tracking and alarms to heighten security. Also, the internal systems of the extranet can be divided into isolated subnets, permitting finely tuned access to a plurality of users. The use of digital certificates allows signed, verified transactions to occur through the extranet, detailed tracking of the actions of extranet users, and secure, restricted access to the extranet.

Figure 5:
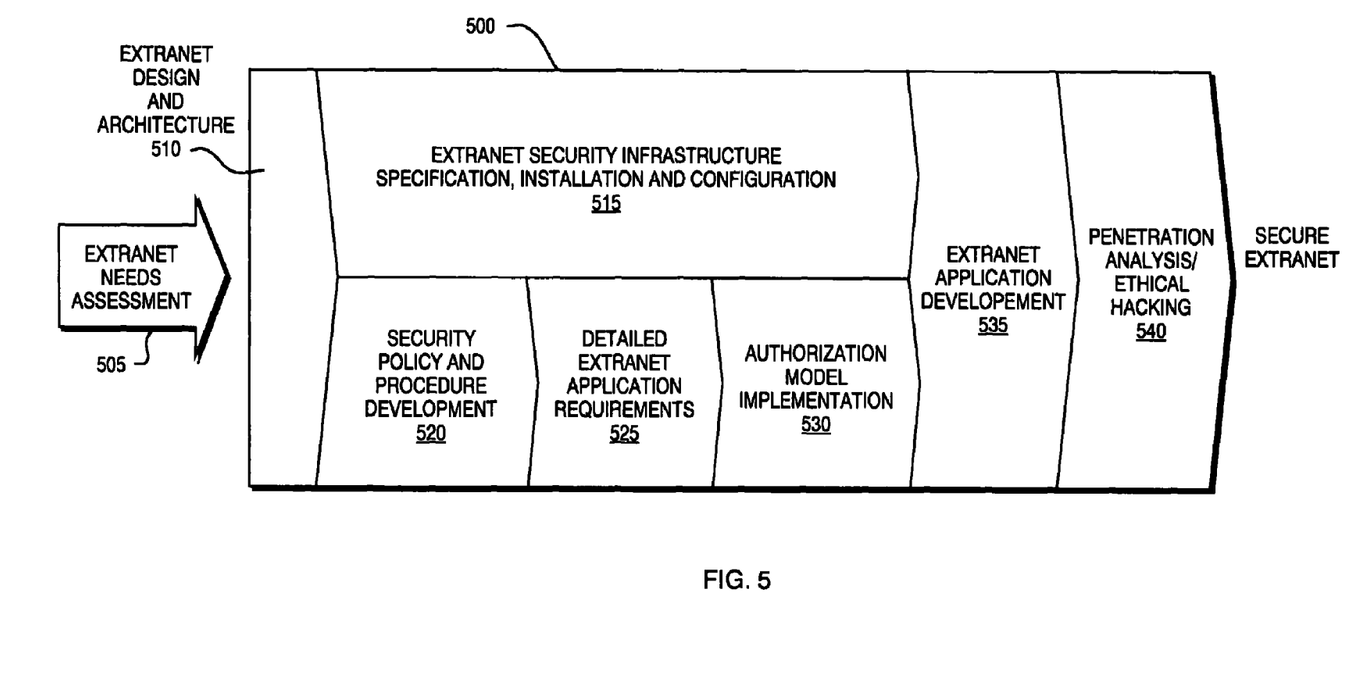
FIG. 5 illustrates a method for configuring an extranet system to the needs of an organization.

Another aspect of the present invention concerns the implementation 500 of a secure extranet as described herein and depicted schematically in FIG. 5. A secure extranet may be implemented by assessing the needs of an organization 505, designing an extranet including components to provide desired functionality 510, installing and configuring an extranet 515, addressing security and access needs to determine an authorization model 520, determining specific application requirements 525, implementing an authorization model 530, developing solutions to meet application requirements 535, and testing the security of the extranet 540. Further information on the processes involved is provided below.

Determining the needs of an organization 505 requires an analysis of several factors. For example, business managers, computer system managers, and other executives may be interviewed to determine the capabilites and functionalities most useful for the organization. Certain issues, such as timing, budget resources, goals, and current systems may influence the development of an extranet. Furthermore, the scale of the extranet, such as the number of supported users, the number of communicating locations, and other related factors may be considered. Existing computer systems, operating platforms, and other technologies in the organization may influence the choice of particular components of the extranet. Also, security needs, including current authentication methods, existing policies, and sensitivity of resources may contribute to the evaluation process. By reviewing these and additional considerations, an extranet implementation strategy may be developed that is tailored to the specific needs of the organization.

Next, extranet components may be selected to meet the particular needs of the organization 510. These components may include any of the components described above. In particular, the selection of an access control package may be based on any number of factors. Different access control packages offer different advantages and possibilities. NETEGRITY SIIEMINDER V3.6 offers multiple web servers with multiple applications and LDAP compatibility. SITEMINDER V3.6 is particularly suitable for organizations which prefer C++, or use BLUESTONE or ALLAIRE. ENCOMMERCE GETACCESS V3.0 also supports multiple web servers with multiple applications, supports CORBA (Common Object Request Broker Architecture), and is well suited to organizations which prefer Java, or use HART or NETDYNAMICS. ENTEGRITY ASSUREWEB may be employed when other ENTEGRITY products are in use, signed messages are required, strong international encryption is desired, or the organization prefers to avoid cookies. NETSCAPE ENTERPRISE SERVER V3.x or MICROSOFT IIS 4.0 may be preferred choice when central user management is not required, or access control is required for a single web server. AVENTAIL EXTRANETCENTER offers access to back-end applications that may be unavailable using other software packages.

Hardware components of the extranet system may be selected according to software manufacturer's preferences, for compatibility with the current hardware utilized by the organization, or according to any other considerations known to those of skill in the art.

After selecting the various hardware and software components of the extranet 510, the extranet may be assembled and tested according to procedures known in the art 515. The tests performed may verify correct installation, confirm interconnectivity of a plurality of servers, or may simulate actual usage to identify bugs or other errors in the extranet system. A standard test may be applied, or a test may be developed to suit the particular configuration and components of the organization's extranet.

User accounts may be established for users designated by the organization. User information, including personal information such as name and mailing address, company information such as title, organization, location/address, phone/fax numbers, website address, e-mail address, and other information may be gathered and input into the extranet system. Furthermore, information such as IP address, certificate authorization method, and other relevant information may be included for each user account. The extranet system may then be configured with the appropriate accounts and additional functionality that may be useful for supporting the desired functionality for the designated users.

Representatives of the organization may be trained in operation and maintenance of the extranet. For example, representatives may be trained in certificate authority configuration, user accounts and directories administration, user account privileges control, Web server administration, and firewall maintenance. Then, account users may be trained, for example, in account access and navigation.

Security policies and procedures may be designed 520 and implemented 530, for example, to eliminate security breaches and increase the effectiveness of the extranet. Security requirements may first be determined, existing policies and procedures may be reviewed, and extranet policies and procedures may be planned and implemented.

Particular requirements may be identified 525 and implemented 535 for the organization's extranet. For example, management structure, e.g., centralized or distributed, may be determined, existing databases may be evaluated, and authorization protocols, user roles, and other particular considerations may be taken into account for tailoring the extranet to the needs and requirements of the organization. For example, a component may be included to permit automation of certificate authorization. The extranet may also be modified to increase compatibility with preexisting databases, hardware, software, or other resources.

The extranet may be tested 540, for example, by penetration analysis such as war dialing, perimeter security scanning, and probing of hosts and servers, to uncover vulnerabilities in the extranet's security. Using this data, security recommendations may be identified and implemented to further reinforce the security of the extranet.

The configurations depicted above offer a number of advantages. For example, the use of digital certificates for authentication of user identities permits strong protection of access to the extranet and to management functions. The multi-tiered architecture employed in the systems set forth above places a router providing packet filtering at the front end together with a firewall providing real-time tracking and alarms to heighten security. Also, the internal systems of the extranet are divided into isolated subnets, permitting finely tuned access to a plurality of users. Furthermore, the various components of the extranet systems described may be preassembled to provide simple, inexpensive, and rapid installation of an extranet system, and the individual components may be easily replaced, for example, for upgrade, expansion, or modification. The use of digital certificates allows signed, verified transactions to occur through the extranet, detailed tracking of the actions of extranet users, and secure, restricted access to the extranet.

Figure 6:
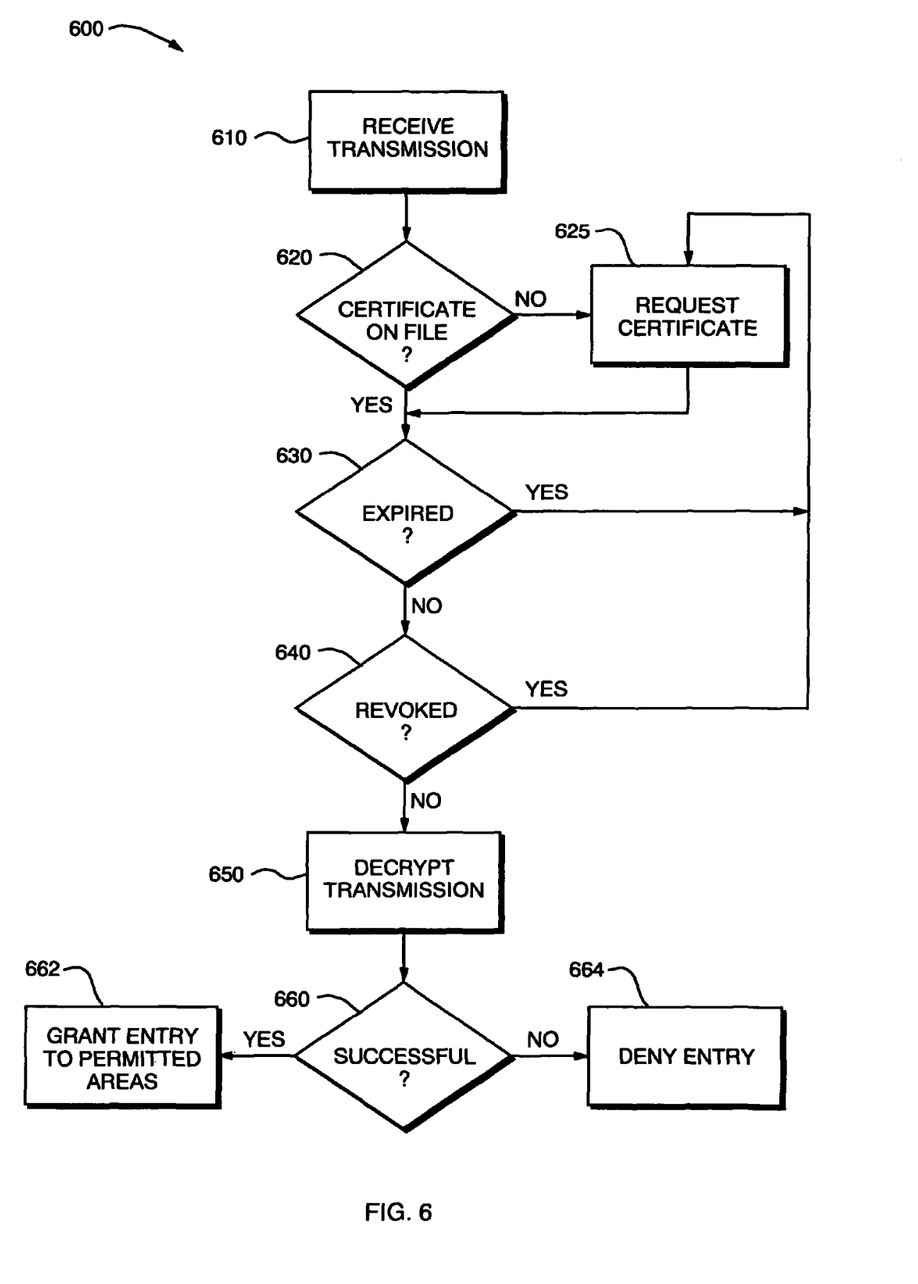
FIG. 6 represents a method for authenticating a user's identity from a transmission sent by the user.

An exemplary method by which an extranet may verify a user's identity is outlined in FIG. 6. In the method 600, the extranet receives an encrypted transmission from a user 610 and checks whether a certificate for the user is on file 620. If a certificate is not on file, the extranet requests a certificate from the user 625 and proceeds when a certificate has been received. The extranet then determines whether the certificate has expired 630 or has been revoked 640. If either condition is true, the extranet requests a new, valid certificate from the user 625. If a valid certificate is on file with the extranet, the extranet then decrypts the transmission 650 to determine that the transmission was encrypted by the user's certified private key. If the transmission is not successfully decrypted 660, the user is denied access 664. If the transmission is successfully decrypted, the user is granted access to the extranet or portions thereof to which the user has been permitted access. Further transmissions from the user may then be decrypted using the user's public key to identify that the transmissions originated from the user and that no unauthorized transmissions are ascribed to the user. Other techniques for controlling access to a computer site, for example, by using certificate authentication, will be apparent to one of skill in the art and are intended to be encompassed by the scope of the present disclosure.

While the invention has been disclosed in connection with the embodiments shown and described in detail, various equivalents, modifications, and improvements, such as extranets used in health care, on-line banking, or other personal account management applications, will be apparent to one of ordinary skill in the art from the above description. Such equivalents, modifications, and improvements are intended to be encompassed by the following claims.

We claim:

1. An access system, comprising:
    a certificate authentication component to verify a user's identity from a digital certificate supplied by the user,
    a directory, coupled to the certificate authentication component, to maintain an account for each individual user, each account containing an access policy specifying at least one portion of a computer site to which the corresponding user is permitted access, the computer site being divided into isolated subnets, each at least one portion included in one of the subnets, each account further containing at least one of an internet protocol (IP) address and a certificate authorization method associated with the user, and
    an access control system, in computer hardware coupled to the directory, for controlling access to the computer site by permitting the user to access one or more of the subnets including one of said each at least one portion of the computer site and restricting the user from accessing at least one other portion of the computer site, based on the access policy associated with the individual user in the directory, wherein the access policy is used to provide tiered access for different sets of users to a plurality of security levels.

2. The access system of claim 1, further comprising a digital signing module that produces and stores at least one of a digital signature and a timestamp for a transaction.

3. The access system of claim 1, wherein users are categorized into discrete sets, and each set is granted access to a particular portion of the computer site according to the access policy.

4. The access system of claim 1, the system configured to use information relating to the user to present to the user personalized information.

5. The access system of claim 4, wherein the information relating to the user is at least one of the user's navigation history and the user's preferences.

6. The access system of claim 4, wherein the personalized information is at least one of information relating to new products and developments in the user's field of interest.

7. The access system of claim 1, the system configured to maintain an archive relating to the account, the archive including information relating to at least one of purchases made, available credit, applicable discounts, and links to specific recorded transactions.

8. The access system of claim 1, the system being configured for supporting desired functionality of designated users.

9. The access system of claim 1, further comprising an automation component to permit automation of certificate authorization.

10. A method, comprising:
    receiving a request, in computer server hardware, from a user to access a computer site or a portion thereof, the request including information representative of the user's identity;
    verifying the user's identity from the information by consulting a directory that includes accounts for individual users, each account containing an access policy specifying at least one portion of the computer site to which the corresponding user is permitted access, the computer site being divided into isolated subnets, each at least one portion included in one of the subnets, each account further containing at least one of an internet protocol (IP) address and a certificate authorization method associated with the user;
    controlling access to the computer site by permitting the user to access one or more of the subnets including a portion of the computer site and restricting the user from accessing at least one other portion of the computer site, based on the access policy for the user, wherein the access policy is used to provide tiered access for different sets of users to a plurality of security levels;
    controlling access to the computer site by permitting the user to access a portion of the computer site and restricting the user from accessing at least one other portion of the computer site, based on the access policy associated with the user.

11. The method of claim 10, further comprising producing and storing at least one of a digital signature and a timestamp for a transaction.

12. The method of claim 10, further comprising categorizing users into discrete sets, and granting each set access to a particular portion of the computer site according to the access policy.

13. The method of claim 10, further comprising using information relating to the user to present to the user personalized information.

14. The method of claim 13, wherein the information relating to the user is at least one of the user's navigation history and the user's preferences.

15. The method of claim 13, wherein the personalized information is at least one of information relating to new products and developments in the user's field of interest.

16. The method of claim 10, further comprising maintaining an archive relating to the account, the archive including information relating to at least one of purchases made, available credit, applicable discounts, and links to specific recorded transactions.

17. The method of claim 10, further comprising supporting desired functionality of designated users.

18. The method of claim 10, further comprising automating certificate authorization.

19. An access system for a computer site, comprising:
    a certificate authentication component to verify a user's identity from a digital certificate supplied by the user,
    a directory, coupled to the certificate authentication component, to maintain an account for each individual user, each account containing an access policy specifying at least one portion of a computer site to which the corresponding user is permitted access, the computer site being divided into isolated subnets, each at least one portion included in one of the subnets, each account further containing at least one of an internet protocol (IP) address and a certificate authorization method associated with the user, and
    an access control system, in computer hardware coupled to the directory, for controlling access to the computer site by permitting the user to access one or more of the subnets including one of said each at least one portion of the computer site and restricting the user from accessing at least one other portion of the computer site, based on the access policy associated with the individual user in the directory, wherein the access policy is used to provide tiered access for different sets of users to a plurality of security levels;

and further wherein the access control system is configured to use information relating to the user to present to the user personalized information, the information relating to the user being at least one of the user's navigation history and the user's preferences, and the personalized information being at least one of information relating to new products and developments in the user's field of interest.

* * * * *